SUBSCRIPTION TELEVISION SYSTEM

Filed Dec. 23, 1952 3 Sheets-Sheet 1

ROBERT ADLER
ERWIN M. ROSCHKE
*INVENTORS.*

BY Francis W. Crotty

THEIR ATTORNEY.

ROBERT ADLER
ERWIN M. ROSCHKE
*INVENTORS.*
BY Francis W. Crotty
THEIR ATTORNEY.

July 15, 1958 R. ADLER ET AL 2,843,657

SUBSCRIPTION TELEVISION SYSTEM

Filed Dec. 23, 1952 3 Sheets-Sheet 3

ROBERT ADLER
ERWIN M. ROSCHKE
*INVENTORS.*

BY *Francis W. Crotty*

THEIR ATTORNEY.

United States Patent Office 2,843,657

Patented July 15, 1958

2,843,657

SUBSCRIPTION TELEVISION SYSTEM

Robert Adler, Northfield, and Erwin M. Roschke, Des Plaines, Ill., assignors to Zenith Radio Corporation, a corporation of Delaware Application December 23, 1952, Serial No. 327,576

8 Claims. (Cl. 178—5.1)

Figure 1:
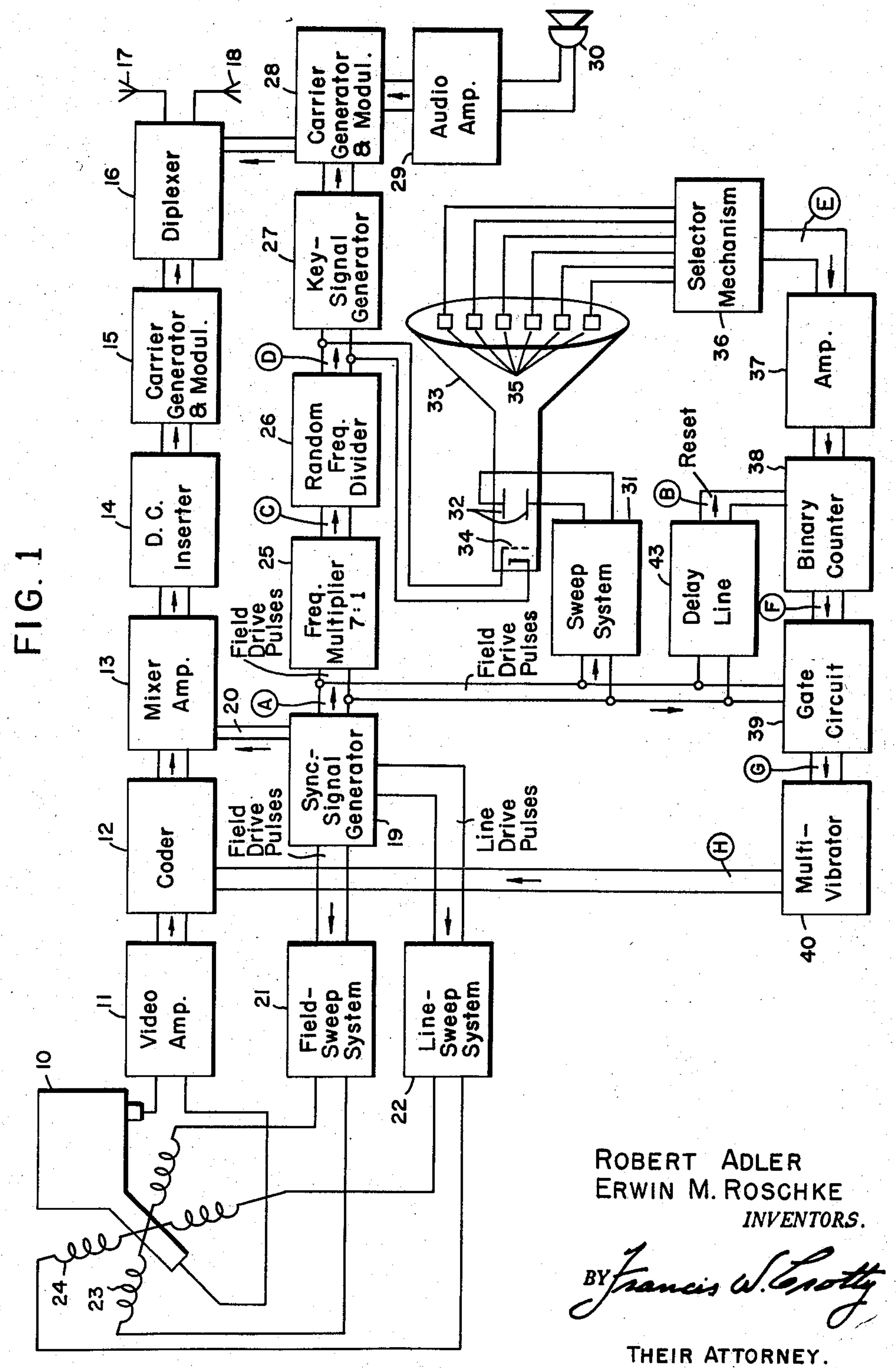

This invention relates to subscription television systems in which a television signal is transmitted in coded form to be utilized only in subscriber receivers having appropriate decoding apparatus actuated in accordance with the coding schedule employed at the transmitter.

Since the invention may be practiced in either a transmitter or receiver, the term "encoding" has been used herein in its generic sense to encompass either coding at the transmitter or decoding at the receiver.

Subscription television systems have been proposed in which a television signal is coded in accordance with a selected coding schedule at the transmitter, and in which a key signal indicating the coding schedule of the telecast is made available to subscriber receivers, being disseminated, for example over a signal channel such as a closed wire circuit. Systems of this general type are disclosed and claimed in Patent 2,510,046, issued May 30, 1950, in the name of Alexander Ellett et al. and in Patent 2,547,598, issued April 3, 1951, in the name of Erwin M. Roschke, both of which are assigned to the present assignee.

The use of a closed wire circuit for distributing the key signal to subscriber receivers is advantageous as it provides maximum secrecy and facilitates the assessment of subscription fees. Nevertheless, the key signal may be transmitted as a modulation component of the coded television signal itself or it may be sent over any other ether link. However, when this expedient is resorted to, the key signal preferably should not be a direct manifestation of the coding schedule of the telecast; otherwise it is too easily appropriated by unauthorized persons for decoding purposes.

Copending application Serial No. 281,418, filed April 9, 1952, in the name of George V. Morris et al., entitled "Subscription Television System," and assigned to the present assignee, discloses and claims a subscription television system in which an air-borne key signal is distributed to subscriber receivers but it conveys coding information in transposed form so that a compensating transposition must be made at the receivers before it may be used for decoding purposes. Such a coded key signal may be distributed as a modulation component of the coded television signal without any great possibility of its being used by unauthorized receivers.

The specific embodiments of the Morris et al. application effect mode changes of the television system and accomplish encoding in response to pulses that are examined, so to speak, in each interval in which there is a determination of operating mode. For example, the presence of such pulses in the mode-determining interval results in the establishment of one operating mode while the absence of such pulses in that interval results in an alternate mode. In another case, the absolute number of pulses derived in any mode-determining interval dictates the particular mode to be employed; for instance, a single pulse denotes mode one; a pair of pulses denotes a second mode; the absence of pulses denotes still another mode and so forth. The present invention stems from the previous work of Morris et al. and concerns itself with the same general type of arrangement. It effects coding and provides secrecy with a relatively simple arrangement of components characterized by the fact that the mode established in any mode-determining interval is governed by whether the pulses examined are odd or even in number and irrespective of the absolute number of such pulses.

It is accordingly an object of the present invention to provide an improved and simplified encoding arrangement for a subscription television system of the type disclosed by Morris et al.

In accordance with the present invention, an encoding arrangement for a subscription television system comprises encoding apparatus for establishing either one of two different operating modes in the system. In order to select the particular modes, means are provided for deriving during each of a series of mode-determining intervals a variable number of control pulses in accordance with an encoding schedule employed in the system. There is an actuating circuit which has two stable operating conditions and is responsive to successive ones of applied pulses to shift from one to the other of those operating conditions. Means are included for applying the aforesaid control pulses to the actuating circuit so that at the conclusion of each mode-determining interval the actuating circuit assumes one of its operating conditions if it has received an even number of control pulses and assumes the other of its operating conditions if it has received an odd number of control pulses in the mode-determining interval. Finally, the arrangement includes means, including means coupling the actuating circuit to the encoding apparatus, for operating the encoding apparatus to establish an operating mode in the system throughout an ensuing interval in accordance with the operating condition assumed by the actuating circuit at the conclusion of each mode-determining interval.

Figure 2:
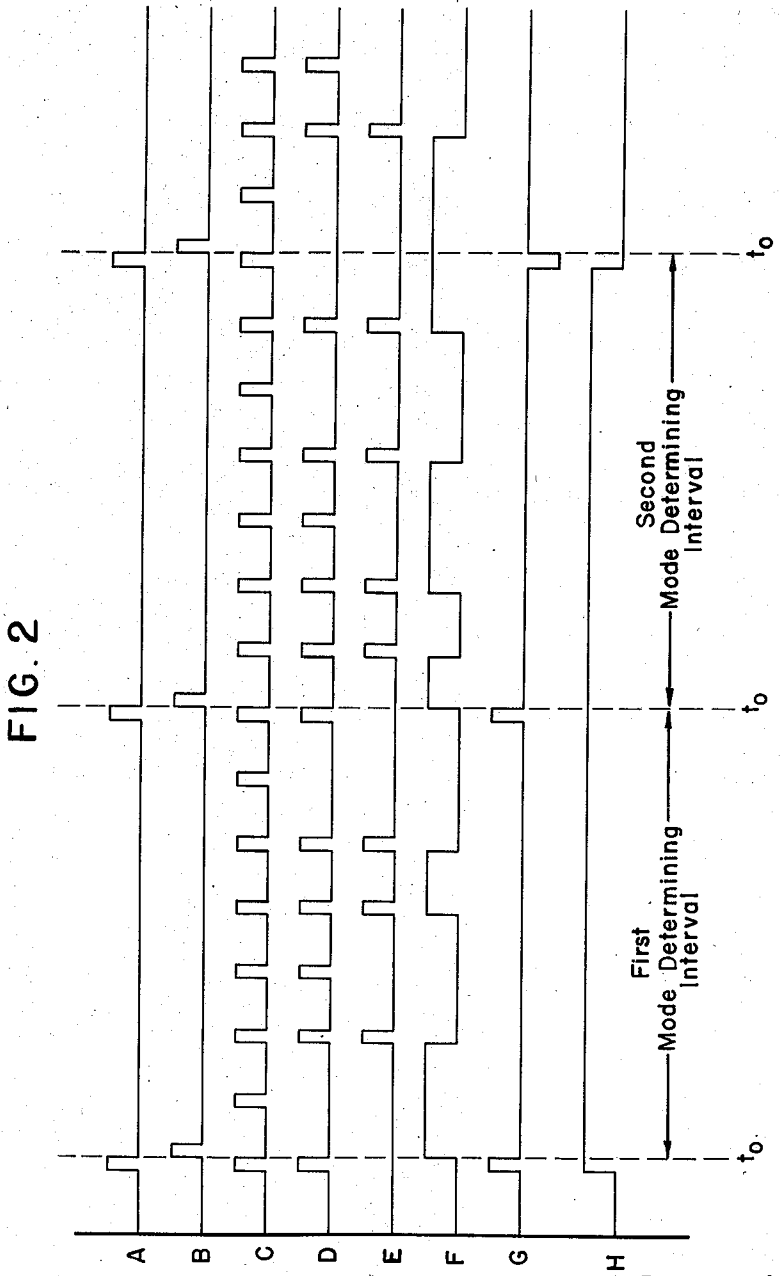
Figure 3:
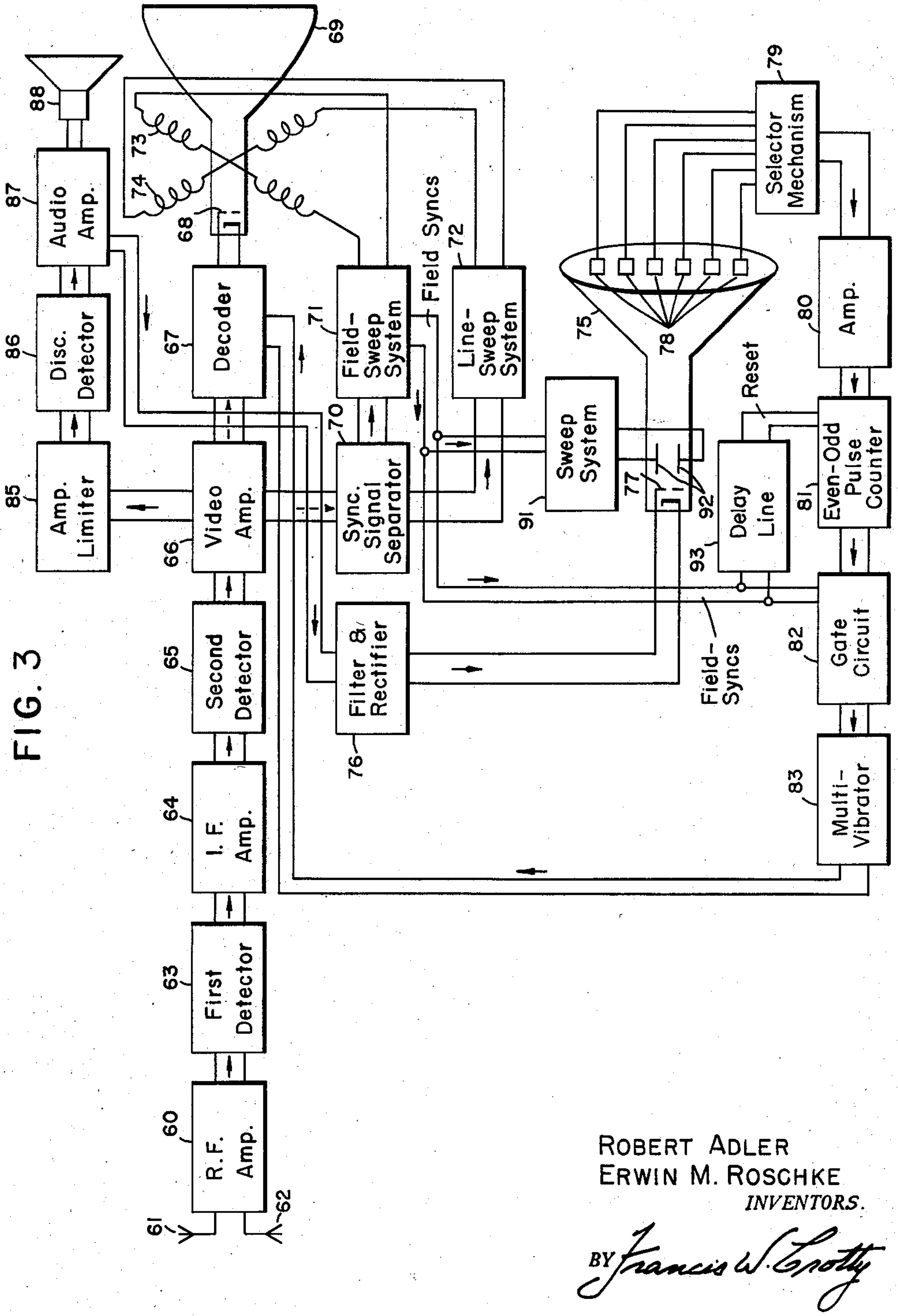

The features of this invention which are believed to be new are set forth with particularity in the appended claims. The invention, however, together with further objects and advantages thereof, may best be understood by reference to the following description in conjunction with the accompanying drawings, in which:

Figure 1 represents a subscription television transmitter constructed in accordance with the invention, Figure 2 is a family of curves used in explaining the operation of the system, and Figure 3 represents a receiver for operation in conjunction with the transmitter of Figure 1.

The transmitter of Figure 1 includes a picture-converting device 10 which may be an iconoscope, image orthicon or other well-known type. The output terminals of device 10 are connected through a video amplifier 11 and a coder 12 to the input terminals of a mixer amplifier 13. Coder 12 may be similar to that disclosed and claimed in copending application Serial No. 243,039, filed August 22, 1951, and issued August 7, 1956, as Patent No. 2,758,153, in the name of Robert Adler, entitled "Subscription Television System" and assigned to the present assignee. It may comprise a beam-deflection tube having a pair of output circuits which may be selectively coupled into the video channel as the beam is deflected from one to the other of two segmental anodes coupled to such output circuits. One of these circuits includes a time-delay network so that the timing of the video components relative to the synchronizing components varies as the beam of the deflection tube is switched between anodes. This switching effect is accomplished by means of a beam-deflection control or actuating signal applied to coder 12, as explained hereinafter. Such intermittent variations in the timing of the video components effectively codes the television signal since conventional television receivers, not equipped with suitable decoding apparatus, depend upon an invariable time relation of the video and synchronizing components of a received signal to reproduce the image intelligence represented thereby.

Viewed from the standpoint of operating modes, coder 12 has two stable operating conditions each of which imposes a different operating mode on the transmitter. In its first operating condition, coder 12 extends the video channel from amplifier 11 to mixer 13 without introducing any material delay and in this condition the transmitter operation is conventional particularly in respect of the time relation of the video and synchronizing components of the radiated signal. In its second operating condition coder 12 introduces a time delay in the video channel and the transmitter then functions in an abnormal mode since the video and synchronizing components of the radiated signal have an abnormal time relation with respect to one another.

Mixer amplifier 13 is connected through a direct-current inserter 14 to a carrier-wave generator and modulator 15 which, in turn, is connected through a diplexer 16 to an antenna 17, 18. The transmitter also includes a synchronizing-signal generator 19 which supplies line- and field-synchronizing components and associated pedestal components to mixer 13 over leads 20. Generator 19 also supplies field- and line-drive pulses to a field-sweep system 21 and to a line-sweep system 22, respectively. The output terminals of sweep systems 21 and 22 are connected to the field-deflection elements 23 and line-deflection elements 24, respectively, associated with picture-converting device 10.

Generator 19 additionally supplies field-drive pulses to a frequency multiplier 25 which, for example, may multiply these pulses seven times. The output terminals of multiplier 25 are connected to a random-frequency divider 26, which may be constructed in the manner of Patent 2,588,413, issued March 11, 1952, to E. M. Roschke and assigned to the present assignee. The random-frequency divider is connected to a key-signal generator 27 which, in turn, is coupled to a carrier-wave generator and frequency modulator 28. Preferably, generator 27 develops a signal having a frequency outside of the audio band of the television system. Unit 28 generates the sound carrier of the system and frequency modulates the key signal from generator 27 on that carrier. The unit has further input terminals connected through an audio amplifier 29 to a microphone 30. The output terminals of carrier-wave generator and modulator 28 are connected to diplexer 16.

Generator 19 also supplies field-drive pulses to a sweep system 31 which has output terminals connected to the deflection elements 32 of a cathode-ray type of commutator device 33. The commutator has a series of anode segments or output electrodes 35 connected to a selector mechanism 36 and has input electrodes 34 connected to the output terminals of random-frequency divider 26. The selector mechanism may comprise a series of six on-off toggle switches, one associated with each anode segment and all of them connected to common output terminals. With this arrangement, any desired combination of the anode segments may be connected to the selector output terminals depending on the particular coding schedule to be employed. The random-frequency divider, the commutator and the selector collectively constitute means for deriving during each of a series of mode-determining intervals a number of control pulses in accordance with the coding schedule assigned to the transmitter for the particular subscription telecast. Their conjoint operation in that respect will be considered in more detail hereinafter.

The encoding portion of the transmitter further includes a control or actuating circuit, specifically represented as a binary counter 38 having two stable operating conditions. It may, for example, take the form of a well-known Eccles-Jordan type of multivibrator characterized by the fact that successive pulses applied thereto trigger the circuit from one to the other of its operating conditions.

Additional means are provided for supplying the control pulses derived at the output terminals of selector 36 to the binary counter so that in each mode-determining interval the counter assumes one of its stable operating conditions in response to an even number of control pulses and assumes the other of its operating conditions in response to an odd number of control pulses. The means in question comprise an amplifier 37 which couples the output terminals of selector 36 to the signal input terminals of binary counter 38.

Binary counter 38 is coupled to coder 12 to establish an operating mode in the transmitter in each mode-determining interval in accordance with the operating condition assumed by the counter in that particular interval. Coupling is accomplised, in part, through a gate circuit 39 connected to the output terminals of the counter and having further input terminals connected to synchronizing-signal generator 19 in order to receive field-drive pulses therefrom. The gate circuit is of the normally closed type but translates field-drive pulses under the conjoint control of those pulses and the output signal obtained from the binary counter. More particularly, during any mode-determining interval in which the counter is in its first operating condition the field-drive pulses translated through the gate circuit appear at the output terminals thereof with one polarity while in another mode-determining interval in which the binary is in its alternate operating condition such field pulses are delivered to the output terminals of the gate circuit with opposite polarity.

A control circuit or multivibrator 40 is coupled to the output terminals of gate circuit 39 to receive the field-drive pulses translated therethrough and its output signal is applied to the deflection elements of coder 12 to constitute a deflection control signal. This multivibrator is a mono-stable circuit sensitive to applied pulses of either polarity. Once it is triggered to a particular one of its two operating conditions by a pulse of a given polarity it can only be restored to its alternate operating condition by a pulse of the opposite polarity.

It is desirable in the particular system illustrated to restore binary counter 38 to a reference operating condition at the start of each field-trace interval and to that end field-drive pulses from generator 19 are applied to the counter through a delay line 43. Line 43 has a delay exceeding the time duration of field-drive pulses.

In considering the operation of the described transmitter the technique of coding will be disregarded initially. Picture converting device 10 produces video-frequency components representing the program information to be televised and these components after amplification in amplifier 11 are supplied through coder 12 to mixer 13. The mixer also receives the usual line- and field-synchronizing and blanking pulses from generator 19 so that a composite television signal is developed therein. That signal is adjusted as to background level in direct current inserter 14 and is amplitude modulated on a picture carrier in unit 15. The modulated video carrier is supplied to antenna 17, 18 through diplexer 16 for transmission to subscriber receivers. At the same time, the audio information accompanying the video information is picked up by microphone 30 and supplied to unit 28 through an audio amplifier 29. In unit 28 the audio information, according to present practice, is frequency modulated on a sound carrier which modulated carrier is applied through diplexer 16 to antenna 17, 18 from which it is concurrently radiated with the modulated video signal. It will, of course, be understood that in the generation of the video-frequency components sweep systems 21 and 22 are synchronized by the field- and line-drive pulses delivered thereto by generator 19. Consideration will now be given to the manner in which that telecast is coded in accordance with the present invention.

Periodically recurring field-drive pulses, shown in curve 2A, are supplied by generator 19 to frequency multiplier 25 wherein they are multiplied seven times to produce the pulses of curve 2C. The latter pulses are divided in random divider 26, producing the pulses of curve 2D which are applied to the input electrodes 34 of commutator 33. These pulses intensity modulate the cathode-ray beam of the commutator as it scans over anode segments 35 under the control of sweep system 31 which, in turn, is synchronized by the field-drive pulses of curve 2A. Preferably, for the case under consideration the commutator has only six anode segments 35 disposed along the sweep path of its beam so that the first of the multiplied pulses, which is in time coincidence with a field-drive pulse, occurs before the beam reaches any anode segment in its sweep. The remaining ones of the multiplied pulses, however, occur at successive intervals in which the beam is incident upon the successive anode segments. In any sweep cycle, the cathode-ray beam is turned on by such of the multiplied pulses as are selected in that cycle by random divider 26. When the beam is thus energized, a pulse of potential is developed across the load impedance (not shown) connected in circuit with the particular anode segment upon which the beam impinges at that particular moment. In that manner, the combination of pulses selected by random divider 26 during any sweep cycle is effectively transferred to the switch complement of selector 36. A further selection of these pulses is accomplished in the selector.

Each switch of the selector which is closed extends the circuit of its associated anode segment to the output terminals of the selector. On the other hand, each switch that is in its open position interrupts the connection of its assigned anode segment with the output terminals of the selector. As a consequence, the output pulses obtained from the selector, curve 2E, are conjointly determined by two selections; a first selection made by divider 26, and a succeeding selection made by the setting of the several switches of the selector. Usually, the switch setting is chosen and is maintained constant for a single program. It will be apparent that each pulse of curve 2E is obtained from an anode segment energized in response to a pulse from divider 26 and connected to the output terminals of selector 36 by its associated on-off switch. For convenience, the sweep cycle of the commutator, within which the double pulse selection is achieved, may be referred to as a mode-determining interval. Two and a fraction such intervals are represented in the curves of Figure 2.

The pulses obtained from the selector in any such mode-determining interval are supplied through amplifier 37 to binary counter 38 which is triggered from one to the other of its operating conditions by the successive pulses. Assuming that the binary is in a particular or known one of its operating conditions at the start of the mode-determining interval, its final condition at the end of that interval is determined by its having received an even or an odd number of pulses. The case in which it may receive no pulses corresponds with and may be considered to be included within the effect of even-numbered pulses. The potential of the output terminals is an indication of its operating condition.

Curve 2F indicates the amplitude variations of the terminal potential of the binary and it is seen that at the start $t_0$ of each mode-determining interval the terminal potential is high, a condition that is characteristic of one (the first) stable operating state of the binary. The first pulse applied to the binary after time $t_0$ triggers the binary to its alternate (second) state which is manifested by a drop in the terminal potential. In the first mode-determining interval represented, an odd number (three) of pulses are supplied to the binary which, therefore, assumes its second operating condition for which the terminal potential is low. In the next mode-determining interval, an even number (four) of pulses are received by the binary which, accordingly, assumes its first operating condition for which the terminal potential is high. Hence, an output signal is derived from the binary, having amplitude excursions between maximum and minimum values and, in particular, having an amplitude level at the end of each mode-determining interval determined by the code schedule involved which, in turn, governs whether an odd or an even number of pulses reach the binary in that interval. As will become apparent presently, the amplitude level of that signal at the end of the mode-determining intervals controls coder 12 and establishes the operating mode of the transmitter for the next interval.

For more accurate timing of mode changes, however, it is convenient to make use of the field-drive pulses in conjunction with the output signal from the binary. This is accomplished by gate circuit 39. Referring again to Figure 2, gate circuit 39 translates a field-drive pulse with no polarity reversal at the end of the first mode-determining interval but the pulse translated thereby at the end of the next interval undergoes a polarity reversal, as indicated in curve 2G. The polarity change results from the fact that the binary received an odd number of pulses in the first interval but an even number in the next interval. The pulses from gate circuit 39 trigger multivibrator 40.

All positive pulses applied to the multivibrator trigger it to one operating condition and all negative pulses shift it to the opposite condition. There results from the multivibrator a deflection control signal shown in curve H. The amplitude excursions of this signal shift the beam of coder 12 to effect mode changes and encoding of the subscription signal as explained hereinbefore.

The field-drive pulses applied to gate circuit 39 are concurrently applied to delay line 43 and reach reset terminals of the binary immediately after multivibrator 40 has received an actuating pulse from the gate circuit. This is apparent upon a comparison of curves B and G of Figure 2 wherein curve B represents the reset pulses. If the binary is in its first operating condition when a reset pulse is received, the pulse is ineffective. Should the binary be in its second operating condition at the receipt of a reset pulse it is triggered thereby to its first operating condition. For this reason, the binary is in a reference condition at each time $t_0$, starting each mode-terminating interval. The pulses selected by divider 26 must be made known to subscriber receivers to permit decoding of the subscription telecast. To that end, each such pulse energizes key-signal generator 27 to develop a corresponding burst of key signal which is modulated on the sound carrier and radiated. The bursts of key signal indicate the number and time position of the pulses from divider 26 supplied to commutator 33, and convey this necessary information to subscribed receivers as modulation components of the sound carrier. Since the key-signal bursts are generated during field-trace intervals, they may have a sufficient duration and time separation for convenient modulation and distribution to subscriber receivers.

The receiver of Figure 3, which may utilize the telecast originating at the transmitter of Figure 1, comprises a radio-frequency amplifier 60 having input terminals connected to an antenna circuit 61, 62 and output terminals connected to a first detector 63, the output terminals of the detector being connected to an intermediate-frequency amplifier 64. The output terminals of the intermediate-frequency amplifier are connected through a second detector 65 to a video amplifier 66 which, in turn, is coupled through a decoder 67 to the input electrodes 68 of a cathode-ray image-reproducing device 69. Decoder 67 may be similar to coder 12 at the transmitter except that it is connected to operate in a complementary fashion in order effectively to compensate for the variations in timing of the received television signal. Video amplifier 66 is connected to an amplitude limiter 85 which, in turn, is connected through a discriminator-detector 86 to an audio amplifier 87, the output terminals of the audio amplifier being connected to a speaker 88.

Video amplifier 66 is also connected through a synchronizing-signal separator 70 to a field-sweep system 71 and a line-sweep system 72. The output terminals of sweep systems 71 and 72 are connected respectively to field-deflection elements 73 and line-deflection elements 74, associated with reproducing device 69. Field-synchronizing pulses are derived from field-sweep system 71 and are supplied to a sweep system 91 having output terminals connected to the deflection elements 92 of a commutator 75. Audio amplifier 87 is also connected to a filter-and-rectifier unit 76 having output terminals connected to the input electrodes 77 of commutator 75. The commutator has a series of anode segments 78, corresponding to similar segments 35 at the transmitter, which are connected to a selector mechanism 79. The selector is connected through an amplifier 80 to control circuit or binary pulse counter 81, the latter being coupled through a gate circuit 82 to a multivibrator 83; the output terminals of the multivibrator are connected to decoder 67. Field-synchronizing components from sweep system 71 are also supplied to gate circuit 82 and through a delay line 93 to counter 81.

In operation, the coded television signal from the transmitter of Figure 1 is intercepted by antenna circuit 61, 62, amplified by radio-frequency amplifier 60 and heterodyned to the selected intermediate frequency of the receiver in first detector 63. The resulting intermediate-frequency signal is amplified in intermediate-frequency amplifier 64 and detected in second detector 65 to produce a composite video signal. This latter signal is amplified in amplifier 66 and impressed on the input electrodes 68 of reproducer 69 through decoder 67 to control the intensity of the cathode-ray beam of the reproducer in well-known manner. An intercarrier sound signal is separated in video amplifier 66 in accordance with intercarrier-sound principles and is amplitude limited in unit 85 and detected in detector 86. The audio signal components are amplified in amplifier 87 and the sound intelligence is reproduced by speaker 88.

The synchronizing components are separated in separator 70, the field-synchronizing components being utilized to synchronize sweep system 71 and, hence, the field scansion of device 69, whereas the line-synchronizing components are utilized to synchronize sweep system 72 and, therefore, the line scansion of device 69. The field-synchronizing components are also utilized to control sweep system 91 so that the cathode-ray beam in commutator 75 scans anode segments 78 in time coincidence with the scansion of anode segments 35 in commutator 33 at the transmitter. The key-signal bursts, received as a modulation of the sound carrier, are selected by filter-and-rectifier 76 and utilized to modulate the cathode-ray beam in commutator 75. When selector mechanism 79 is adjusted to the same setting as selector mechanism 36 at the transmitter, amplifier 80 receives pulses from the mechanism that are in exact time coincidence with the pulses shown in curve 2E. The pulses are then amplified and supplied to counter 81 which, in turn, applies a signal that is identical to that shown in curve 2F to gate circuit 82. Gate circuit 82 responds to this signal to translate field-synchronizing pulses coincidently with the operation of gate circuit 39 at the transmitter so that multivibrator 83 and, therefore, decoder 67 operate in time coincidence with the operation of multivibrator 40 and coder 12 at the transmitter. Counter 81 is reset at the termination of each field-trace interval by re-set pulses identical to that shown in curve 2B, developed by delaying the field-synchronizing pulses in delay line 93, in the same manner as counter 38 at the transmitter, thereby maintaining the proper phase relations of the counters at the transmitter and receivers. In this fashion, decoder 67 operates in time coincidence with coder 12 of the transmitter so that the signal applied to electrodes 68 of reproducer 69 is suitably compensated to effect the proper image intelligibility.

The invention provides, therefore, an improved subscription television system in which key-signal information, representing the coding schedule of the telecast, may be distributed as a modulation component of the subscription signal while maintaining sufficient secrecy. The invention also provides a system wherein the key-signal information is developed and distributed during a relatively long field-trace interval, thereby enabling convenient distribution as a modulation component of the sound carrier.

While a particular embodiment of the invention has been shown and described, modifications may be made, and it is intended in the appended claims to cover all such modifications as may fall within the true spirit and scope of the invention.

We claim:

1. An encoding arrangement for a subscription television system comprising: encoding apparatus for establishing either one of two different operating modes in said system; means for deriving during each of a series of mode-determining intervals a variable number of control pulses in accordance with an encoding schedule of said system; an actuating circuit having two stable operating conditions and responsive to successive ones of applied pulses to shift from one to the other of said operating conditions; means for applying said control pulses to said actuating circuit so that at the conclusion of each of said mode-determining intervals said actuating circuit assumes one of its aforesaid operating conditions in response to an even number of said control pulses and assumes the other of its aforesaid operating conditions in response to an odd number of said control pulses; and means, including means coupling said actuating circuit to said encoding apparatus, for operating said encoding apparatus to establish an operating mode in said system throughout an ensuing interval in accordance with the operating condition assumed by said actuating circuit at the conclusion of each mode-determining interval.

2. An encoding arrangement for a subscription television system comprising: encoding apparatus for establishing either one of two different operating modes in said system; means for deriving during each of a series of mode-determining intervals a variable number of control pulses in accordance with an encoding schedule of said system; a binary counter circuit having two stable operating conditions and responsive to successive ones of applied pulses to shift from one to the other of said operating conditions; means for applying said control pulses to said binary counter circuit so that at the conclusion of each of said mode-determining intervals said binary counter circuit assumes one of its aforesaid operating conditions in response to an even number of said control pulses and assumes the other of its aforesaid operating conditions in response to an odd number of said control pulses; and means, including means coupling said binary counter circuit to said encoding apparatus, for operating said encoding apparatus to establish an operating mode in said system throughout an ensuing interval in accordance with the operating condition assumed by said binary counter circuit at the conclusion of each mode-determining interval.

3. In a subscription television system for translating a television signal including video components as well as recurring synchronizing components, an encoding arrangement comprising: encoding apparatus for establishing any selected one of two different operating modes in said system effectively to encode said television signal; means for deriving during each of a series of mode-determining intervals a variable number of control pulses in accordance with an encoding schedule of said system;

a binary counter circuit having two stable operating conditions and responsive to successive ones of applied pulses to shift from one to the other of said operating conditions; means for applying said control pulses to said binary counter circuit so that in each of said mode-determining intervals said binary counter circuit assumes one of its aforesaid operating conditions in response to an even number of said control pulses and assumes the other of its aforesaid operating conditions in response to an odd number of said control pulses; a control circuit for actuating said encoding apparatus and having two stable operating conditions in each of which said encoding apparatus establishes a different operating mode in said system; and circuit means coupling said binary counter circuit to said control circuit and conjointly responsive to said synchronizing components and a signal derived from said binary counter circuit for operating said control circuit to determine the operating mode of said system for the next succeeding mode-determining interval.

4. In a subscription television system for translating a television signal including video components as well as recurring synchronizing components, an encoding arrangement comprising: encoding apparatus for establishing any selected one of two different operating modes in said system effectively to encode said television signal; means for deriving during each of a series of mode-determining intervals a variable number of control pulses in accordance with an encoding schedule of said system; a binary counter circuit having two stable operating conditions and responsive to successive ones of applied pulses to shift from one to the other of said operating conditions; means for applying said control pulses to said binary counter circuit so that in each of said mode-determining intervals said binary counter circuit assumes one of its aforesaid operating conditions in response to an even number of said control pulses and assumes the other of its aforesaid operating conditions in response to an odd number of said control pulses; a reset circuit coupled to said binary counter circuit and responsive to said synchronizing components for establishing said binary counter circuit at a reference condition at the beginning of each mode-determining interval; a control circuit for actuating said encoding apparatus and having two stable operating conditions in each of which said encoding apparatus establishes a different operating mode in said system; and circuit means coupling said binary counter circuit to said control circuit and conjointly responsive to said synchronizing components and a signal derived from said binary counter circuit for operating said control circuit to determine the operating mode of said system for the next succeeding mode-determining interval.

5. A subscription television transmitter comprising: a signal source for producing a television signal including video components occurring during a series of field-trace intervals; coding apparatus for establishing any selected one of two different operating modes in said transmitter effectively to code said television signal; means for transmitting the coded television signal to subscriber receivers; means for deriving during each of a series of field-trace intervals a variable number of control pulses in accordance with a coding schedule of said transmitter; a binary counter circuit having two stable operating conditions and responsive to successive ones of applied pulses to shift from one to the other of said operating conditions; means for applying said control pulses to said binary counter circuit so that in each of said field-trace intervals said binary counter circuit assumes one of its aforesaid operating conditions in response to an even number of said control pulses and assumes the other of its aforesaid operating conditions in response to an odd number of said control pulses; and means coupling said binary counter circuit to said coding apparatus to establish an operating mode in said transmitter in an ensuing field-trace interval in accordance with the operating condition assumed by said binary counter circuit to effect coding of said television signal.

6. A subscription television transmitter comprising: a signal source for producing a television signal including audio components, synchronizing components and video components occurring during a series of field-trace intervals; coding apparatus for establishing any selected one of two different operating modes in said transmitter effectively to code said television signal; means for transmitting the coded television signal to subscriber receivers; means for deriving during each of said field-trace intervals a variable number of pulses for transmission to said subscriber receivers along with said audio components to constitute one portion of a coding schedule; selecting means for selecting certain ones of said pulses during each individual field-trace interval in accordance with a second portion of said coding schedule; a binary counter circuit having two stable operating conditions and responsive to successive ones of applied pulses to shift from one to the other of said operating conditions; means for applying the pulses selected by said selector means to said binary counter circuit so that in each of said field-trace intervals said binary counter circuit assumes one of its aforesaid operating conditions in response to an even number of applied pulses and assumes the other of its aforesaid operating conditions in response to an odd number of applied pulses; a control circuit for actuating said coding apparatus and having two stable operating conditions in each of which said coding apparatus establishes a different operating mode in said system; and circuit means coupling said binary counter circuit to said control circuit and conjointly responsive to said synchronizing components and a signal derived from said binary counter circuit for operating said control circuit to determine the operating mode of said transmitter for the next succeeding field-trace interval.

7. A subscription television receiver for utilizing a television signal coded in accordance with a coding schedule, said receiver comprising: an image-reproducing device; circuit means for controlling said reproducing device in accordance with said coded television signal; decoding apparatus included in said circuit means for establishing any selected one of two operating modes in said receiver effectively to decode said television signal; means for deriving during each of a series of mode-determining intervals a variable number of control pulses in accordance with said coding schedule; an actuating circuit having two stable operating conditions and responsive to successive ones of applied pulses to shift from one to the other of said operating conditions; means for applying said control pulses to said actuating circuit so that in each of said mode-determining intervals said actuating circuit assumes one of its aforesaid operating conditions in response to an even number of said control pulses and assumes the other of its aforesaid operating conditions in response to an odd number of said control pulses; and means coupling said actuating circuit to said decoding apparatus to establish an operating mode in said receiver in an ensuing interval in accordance with the operating condition assumed by said actuating circuit to effect decoding of said television signal.

8. A subscription television receiver for utilizing a television signal coded in accordance with a coding schedule, and including a key signal related to said coding schedule, said receiver comprising: an image-reproducing device; circuit means for controlling said reproducing device in accordance with said coded television signal; decoding apparatus for establishing any selected one of two different operating modes in said receiver effectively to decode said television signal; means for utilizing said key signal to derive during each of a series of mode-determining intervals a variable number of control pulses in accordance with said coding schedule; a binary counter circuit having two stable operating conditions and responsive to successive ones of applied pulses to shift from one to the other of said operating conditions; means for applying said control pulses to said binary counter circuit so that in each of said mode-determining intervals said binary counter circuit assumes one of its aforesaid operating conditions in response to an even number of said control pulses and assumes the other of its aforesaid operating conditions in response to an odd number of said control pulses; and means coupling said binary counter circuit to said decoding apparatus to establish an operating mode in said receiver in an ensuing interval in accordance with the operating condition assumed by said binary counter circuit to effect decoding of said television signal.

References Cited in the file of this patent

UNITED STATES PATENTS

| | | |
|---|---|---|
| 2,612,552 | Crotty | Sept. 30, 1952 |
| 2,623,941 | Aram | Dec. 30, 1952 |
| 2,636,936 | Goldsmith | Apr. 28, 1953 |
| 2,664,460 | Roschke | Dec. 29, 1953 |